(12) United States Patent
Oh et al.

(10) Patent No.: US 8,083,597 B2
(45) Date of Patent: Dec. 27, 2011

(54) FIXED TYPE CONSTANT VELOCITY JOINT

(75) Inventors: Seung Tark Oh, Farmington Hills, MI (US); Tae Hong Kim, West Bloomfield, MI (US)

(73) Assignee: Hyundai Wia Corporation (KR)

( * ) Notice: Subject to any disclaimer, the term of this patent is extended or adjusted under 35 U.S.C. 154(b) by 312 days.

(21) Appl. No.: 12/390,943

(22) Filed: Feb. 23, 2009

(65) Prior Publication Data

US 2010/0216558 A1  Aug. 26, 2010

(51) Int. Cl.
*F16D 3/2245* (2011.01)
(52) U.S. Cl. .................................. 464/145; 464/906
(58) Field of Classification Search .............. 464/140, 464/145, 146, 906
See application file for complete search history.

(56) References Cited

U.S. PATENT DOCUMENTS

| | | | | |
|---|---|---|---|---|
| 2,875,600 A * | 3/1959 | Miller, Jr. | | 464/145 |
| 2,949,022 A * | 8/1960 | Leon | | 464/145 |
| 3,447,341 A * | 6/1969 | Miller, Jr. | | 464/145 |
| 6,267,682 B1 | 7/2001 | Sone et al. | | |
| 6,431,988 B1 | 8/2002 | Tone | | |
| 6,551,190 B2 * | 4/2003 | Hofmann et al. | | 464/145 |
| 6,709,338 B2 | 3/2004 | Weckerling et al. | | |
| 6,817,950 B2 * | 11/2004 | Dine | | 464/145 |
| 6,848,999 B2 | 2/2005 | Weckerling et al. | | |
| 7,001,281 B2 | 2/2006 | Krude | | |
| 7,090,583 B1 * | 8/2006 | Dine | | 464/145 |
| 7,112,140 B2 | 9/2006 | Weckerling | | |
| 7,211,002 B2 * | 5/2007 | Dine et al. | | 464/145 |
| 7,393,284 B2 | 7/2008 | Hassenrik et al. | | |
| 7,396,285 B2 | 7/2008 | Weckerling | | |
| 2005/0090317 A1 * | 4/2005 | Hassenrik et al. | | 464/145 |
| 2006/0154734 A1 * | 7/2006 | Hassenrik et al. | | 464/145 |
| 2007/0111806 A1 * | 5/2007 | Weckerling | | 464/145 |
| 2007/0111807 A1 * | 5/2007 | Maucher et al. | | 464/145 |
| 2007/0123356 A1 * | 5/2007 | Lutz et al. | | 464/145 |
| 2009/0054166 A1 * | 2/2009 | Hoshino et al. | | 464/145 |

OTHER PUBLICATIONS

Universal Joint and Driveshaft Design Manual. Warrendale, PA: Society of Automotive Engineers, 1979. p. 147. TJ1059.S62.*

* cited by examiner

*Primary Examiner* — Gregory Binda
*Assistant Examiner* — Josh Skroupa
(74) *Attorney, Agent, or Firm* — Park & Associates IP Law, P.C.

(57) ABSTRACT

A fixed type constant velocity joint includes: an outer race having an inner spherical surface, and a plurality of guide grooves formed in the inner spherical surface of the outer race; an inner race having an outer spherical surface, and a plurality of guide grooves formed in the outer spherical surface of the inner race, said guide grooves of the outer race and said guide grooves of the inner race together forming a plurality of ball guide tracks; a plurality of balls disposed in the ball guide tracks; and a cage having a plurality of windows for retaining the balls therein. The ball guide tracks include first tracks and second tracks with different groove configurations and having dual, multiple, or differentiated center offsets with smaller offsets applied to the tracks having relatively large ball movements and larger offsets applied to the tracks having relatively small ball movements as the joint is articulated for assembling.

19 Claims, 14 Drawing Sheets

OL : LARGE OFFSET
OM : MIDDLE OFFSET
OS : SMALL OFFSET

OL : LARGE OFFSET
OS : SMALL OFFSET

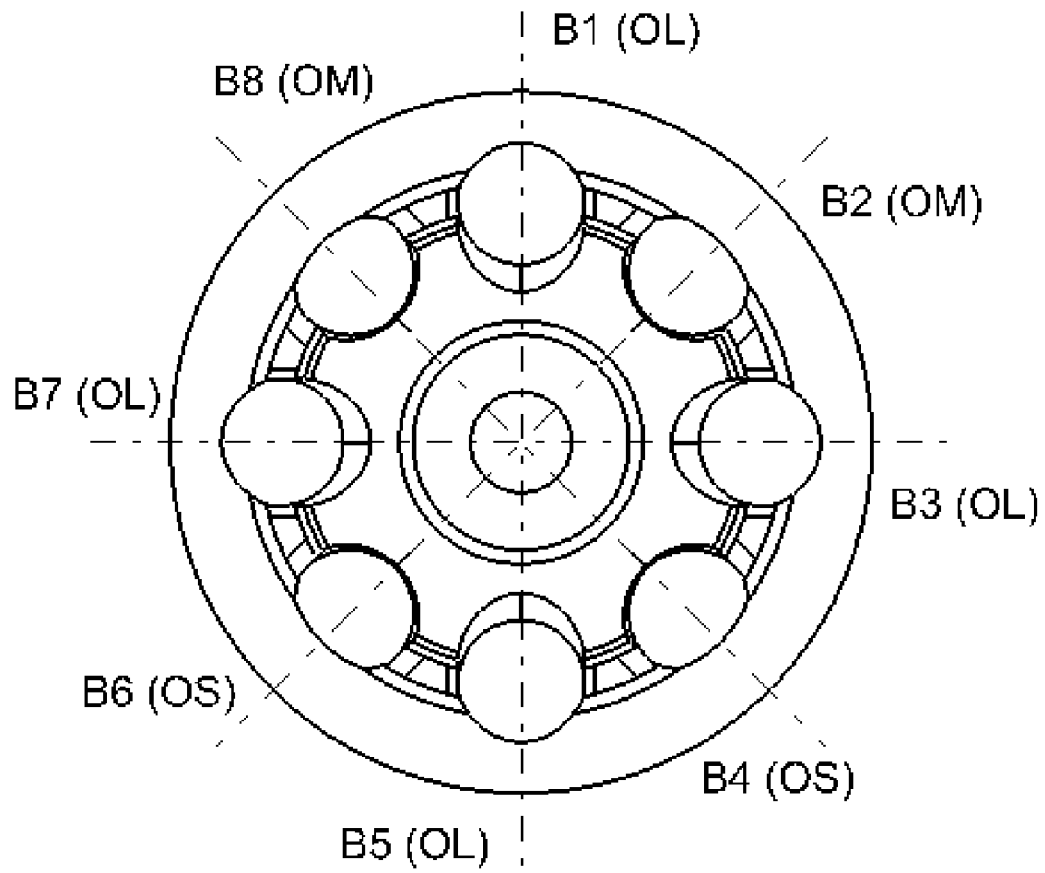

OL : LARGE OFFSET
OS : SMALL OFFSET

OL : LARGE OFFSET
OS : SMALL OFFSET

FIXED TYPE CONSTANT VELOCITY JOINT

FIELD OF THE INVENTION

The present invention relates to a constant velocity joint, and more particularly, to a fixed type constant velocity joint for a drive system, which is typically used in a drive axle of, for example, an automobile for transmitting rotational torque between the rotating shafts with relatively high operating angle.

BACKGROUND OF THE INVENTION

Constant velocity joints typically used in the drive system of vehicles for transferring a rotational torque, are classified typically into the fixed type joint allowing only angular displacement between the axles and the plunging type joint allowing both angular and axial displacement between the axles. The fixed type constant velocity joint is required to operate with a relatively high operating angle of, for example, 45° or more, as compared to the plunging type joint.

FIG. 1 illustrates a conventional fixed type constant velocity joint known as a Rzeppa type constant velocity joint (referred hereinafter as a "Rzeppa joint"). This joint includes an outer race 11 having a spherical inner space formed with a plurality of (i.e., six) outer ball grooves 111, and an inner race 12 with a plurality of (i.e., six) corresponding inner ball grooves 121. A plurality of (i.e., six) torque transmitting balls 13 are received and guided in a respective track defined by a outer ball groove 111 and its corresponding inner ball groove 121, and a cage 14 which has a plurality of (i.e., six) cage windows 141 to hold the balls 13 in a same plane.

In the Rzeppa joint, the ball guide grooves 111 and 121 of the outer and inner races 11 and 12 each have a curved contact surface curved with a radius, and the centers C' and C'' of the outer and inner guide grooves 111 and 121 are respectively offset with respect to the spherical joint center C0 of the outer and inner race 13 and 12 by a same distance "f" in opposite directions. The center offset f of outer ball grooves 111 and inner ball grooves 121 is applied to maintain a constant velocity characteristic and accommodate a smooth movement of balls 13 when the outer and inner joints are articulated with respect to each other. Funnel angles θf are defined as the angles between the tangential lines at the ball contact points in the outer ball grooves 111 and inner ball grooves 121 when the joint is in a specific joint operating angle. The funnel angle θf is decided typically by the pitch circle radius (PCR) of the ball and center offset f of outer ball groove 111 and inner ball groove 121. As the ball 13 is pressed in the grooves 111 and 121 with the funnel angle θf present, a resultant axial force F is applied onto the balls, and consequently, against the cage 14 as the contact force. Thus, a selection of center offset f and funnel angle θf becomes an important factor for the determination of the strength and durability of the joints.

FIG. 1(b) illustrates the funnel angle θf of the Rzeppa joint at the operating angle θ. In this structure, the funnel angles θf of upper ball 13u and lower ball 13w are the same, and funnel angles θf are constant within the joint operating angle θ. FIG. 1(c) illustrates the directions of ball contact forces F for each groove in the typical Rzeppa Joint. The forces F1, F2, F3 and F4 have the same direction and a total ball contact force is calculated as a sum of these forces.

FIG. 2 illustrates a typical shape of cage 14 which has cage windows 141, aligned in a common plane to hold the balls 13 in the same plane. In general, the strength or durability of cage 14 in the fixed type joint is determined by the stress on a web area 142 (i.e., the structural area between the two adjacent cage windows CW), in which the web stress is defined as the ball contact force F (present due to the funnel angle θf) per web area 142. In addition, cage web area 142 is determined by the width of cage windows CW, which are designed to have a size to cover the entire ball movement range during assembly (with minimum assembly angle θa present) and also in operation (with a maximum operating angle θ of joint present). Thus, an optimization in the funnel angle θf and ball movement through selection of an appropriate center offset f is required to improve the strength and durability of cage 14.

FIG. 3(a) illustrates the state when the joints are articulated for assembly. In a typical fixed type joint, the maximum ball movement occurs when the ball 13 assembles to the joint, because the operating angle θ is designed to have an angle less than the assembly angle θa. The minimum assembly angle θa is defined as the angle when the specific ball diameter DB is less than the clearance δ1 between the edge of cage window 141 and the outer edge of outer race groove 111. Therefore, to reduce the minimum assembly angle θa, a distance Dz from the joint center line L0 to the edge of outer race groove 111 needs to be enlarged, and thus, causing to disadvantageously increase the size of the outer race 11 and the joint.

FIG. 3(b) illustrates movements (Mw) of the balls when the joint is in the minimum assembly angle θa. With a joint angle present, the balls 13 assume different angular positions within the cage 14 depending on the angular position of the particular groove relative to the neutral (reference) plane PA of articulation. In this figure, if the minimum assembly angle θa is increased, the maximum ball movement MW (which is measured typically from the center 14d of the cage window) also increases, and consequently, the cage window 141 must also have an increased width CW to obtain the minimum clearance δ2 between ball 13 and a corresponding side of cage web 142, which leads to the reduction of web area 142, and this causes the deterioration in strength of cage 14.

As described above, because the conventional fixed type joint has the above described limitations to the cage design, it is difficult to enlarge the thickness of the cage web area 142 to improve the mechanical strength of the cage which is subject to repeated stresses during operation, and thus, limiting to the ability to design the joint in compact size. Moreover, because the conventional design requires a minimum window size dictated by the necessary minimum assembly angle θa, the volume of the web cage (and thus, the joint) becomes proportionally increased if the conventional joint structure is applied to the high-ball joint with more balls than the traditional six-ball type joint. Thus, because the size of the joint is typically limited in order not to increase the volume and weight of an automobile, the conventional joint design is disadvantageous to apply to the fixed type joint having more than six balls, such as eight or ten balls.

SUMMARY OF THE INVENTION

Accordingly, in view of the drawbacks and disadvantages associated with the conventional joints, the present invention is directed to a fixed type constant velocity joint with reliable construction, enhanced suitable strength and durability.

The present invention is also directed to provide an improved structure and construction for the fixed type constant velocity joints, which can effectively be applicable to the six-ball type joint, which is presently popular for conventional vehicles, and also to the more energy-efficient joints of eight-ball and ten-ball types, etc., which contain many torque-transmitting balls. The present invention is also directed to provide a novel and improved structure to the fixed type constant velocity joint, which can further provide a suitable and sufficient strength and durability to the ball cage (particularly to the web portions of the cage) which is typically susceptible to damage due to the repeated application of high stresses, in particular, onto the cage windows through plural (i.e., six or more) balls received therein to transmit rotational torque between the joint shafts.

As briefly disclosed above, the structure of the conventional joint, such as the Rzeppa joint, has the above identified and other disadvantages and drawbacks in view of cage strength or durability. In attempt to solve the disadvantages and drawbacks of such conventional joints, the present inventors have recognized that one effective method for increasing the cage strength and durability can be realized by optimally increasing the cage web area via the reduction of the maximum ball movement in the cage. In order to accomplish these objectives, the present invention provides the ball groove shape to have a differentiated (for example, dual or multiple) offset configuration having different offsets relative to the angular position of the ball groove, which can effect to reduce the maximum ball movement at the designed joint assembly angle, and thus, increasing the web area of the cage.

As will be described below in detail, the present invention provides differentiated (dual or multiple) offsets in the groove shapes configured to reduce the maximum ball movement in the cage. In this application, the differentiated offset is defined as the application of different offsets depending on the angular position of the particular ball grooves in the outer race and the inner race, preferably, by applying smaller offsets to the track grooves with larger ball movements and larger offsets to the track grooves with smaller ball movements. The maximum ball movement is defined as the maximum movement of the balls when the joint is articulated until it reaches the minimum assembly angle of the joint, in which the ball movement is affected by the center offsets. Also, when the joint is articulated at the minimum assembly angle, the ball movement in each cage varies depending on its angular position of the particular ball groove with respect to the neutral (reference) axis of articulation. For example, in the fixed type joint with six balls, if the joint is articulated for assembling, two balls located at the neutral (reference) axis of articulation (for example, the plane PA' in FIG. 4) do does not move, but each of the other four balls moves by a distance which varies depending on the relative angular location of the balls in the cage window with respect to the neutral or reference axis of articulation. Therefore, according to the present invention, if a smaller offset is applied to the grooves which have larger ball movements and a larger offset is applied for the grooves which have smaller ball movements, the maximum ball movement (which is the maximum movement of the balls when the joint is articulated to the minimum assembly angle, as is defined above) can be reduced without any degradation of operating characteristics.

Accordingly, in the present invention with differentiated offsets, as the maximum ball movement is effectively reduced, the size of the cage windows is reduced and the thickness in cage web area can be enlarged in proportion to the reduced amount of the maximum ball movement. Therefore, the fixed type joint of the present invention can provide an enhanced strength in the cage over the conventional joint without applying the differentiated offset concepts of the invention.

According to one aspect of the present invention, a fixed type constant velocity joint comprises: an outer race having an inner spherical surface, and a plurality of guide grooves formed in an axial direction in the inner spherical surface of the outer race, each guide groove having a circular shape in a longitudinal cross section thereof; an inner race having an outer spherical surface, and a plurality of guide grooves formed in an axial direction in the outer spherical surface of the inner race, each guide groove having a circular shape in a longitudinal cross section thereof, said guide grooves of the outer race and said guide grooves of the inner race together forming a plurality of ball guide tracks arranged around the circumference of the joint; a plurality of balls disposed in the ball guide tracks; and a cage installed between the inner spherical surface of the outer race and the outer spherical surface of the inner race, said cage having a plurality of windows for retaining the balls therein;

wherein the ball guide tracks include different groove configurations having dual, multiple or differentiated center offsets with smaller offsets applied to the tracks having relatively large ball movements and larger offsets applied to the tracks having relatively small ball movements as the joint is articulated for assembling.

According to another aspect of the present invention, a fixed type constant velocity joint comprises: an outer race having an inner spherical surface, and a plurality of guide grooves formed in an axial direction in the inner spherical surface of the outer race; an inner race having an outer spherical surface, and a plurality of guide grooves formed in an axial direction in the outer spherical surface of the inner race, said guide grooves of the outer race and said guide grooves of the inner race together forming a plurality of ball guide tracks arranged around the circumference of the joint; a plurality of balls disposed in the ball guide tracks; and a cage installed between the inner spherical surface of the outer race and the outer spherical surface of the inner race, said cage having a plurality of windows for retaining the balls therein;

wherein the ball guide tracks have different groove configurations, including first tracks with a first groove configuration and second tracks with a second groove configuration;

wherein the groove configuration of the first tracks is characterized in that: each of the guide grooves of the outer race is shaped to have a longitudinal cross section which contains a first circular shape with a center, and each of the guide grooves of the inner race is shaped to have a longitudinal cross section which contains a second circular shape with a center, the center of the first circular shape and the center of the second circular shape are located in opposite sides respectively displaced by a first offset distance from a joint center line of the joint;

wherein the groove configuration of the second tracks is characterized in that: each of the guide grooves of the outer race is shaped to have a longitudinal cross section which contains a first circular shape with a center, and each of the guide grooves of the inner race is shaped to have a longitudinal cross section which contains a second circular shape with a center, the center of the first circular shape and the center of the second circular shape are located in opposite sides respectively displaced by a second offset distance from a joint center line of the joint, the second offset distance smaller than the first offset distance of the first tracks;

wherein the first tracks with larger offset distance are located at the tracks having relatively small ball movements as the joint is articulated for assembling, and the second tracks with smaller offset distance are located at tracks having relatively large ball movements as the joint is articulated for assembling.

According to one preferable embodiment of the invention, the joint contains six balls, and the tracks with smaller offsets are applied at either two tracks located at 120 degree and 240 degree or four tracks located at 60 degree, 120 degree, 240 degree, 300 degree, respectively, when an angular position of the ball closest to the outer race bottom is defined to be at 0 degree as the joint is articulated for assembling, and the remaining tracks other than identified above in this claim have larger offsets.

According to another preferable embodiment of the invention, the joint contains eight balls, and the tracks with smaller offsets are applied at two tracks located at 135 degree and 225 degree or four tracks located at 45 degree, 135 degree, 225 degree, 315 degree, respectively, when an angular position of the ball closest to the outer race bottom is defined to be at 0 degree as the joint is articulated for assembling, and the remaining tracks other than identified above in this claim have larger offsets.

According to another preferable embodiment of the invention, the joint contains ten balls, and the tracks with smaller offsets are applied at two tracks located at 144 degree and 216 degree or four tracks located at 36 degree, 144 degree, 216 degree, 324 degree, respectively, when an angular position of the ball closest to the outer race bottom is defined to be at 0 degree as the joint is articulated for assembling, and the remaining tracks other than identified above in this claim have larger offsets.

According to another preferable embodiment of the invention, the ball guide tracks may further include third tracks with a third groove configuration, in which the groove configuration of the third tracks is characterized in that: each of the guide grooves of the outer race is shaped to have a longitudinal cross section which contains a first circular shape with a center, and each of the guide grooves of the inner race is shaped to have a longitudinal cross section which contains a second circular shape with a center, the center of the first circular shape and the center of the second circular shape are located in opposite sides respectively displaced by a third offset distance from a joint center line of the joint, the third offset distance having a size between the first offset distance of the first tracks and the second offset distance of the second tracks. The third tracks with medium offsets can typically be applicable to tracks with generally medium amount of ball movements as the joint is articulated for assembling.

BRIEF DESCRIPTION OF THE DRAWINGS

The above described and other objects, features and advantages of the present invention will be more apparent from the presently preferred embodiments of the invention disclosed in the following description and illustrated in the accompanying drawings, in which:

FIG. 6(c) is a right side view illustrating the application of differentiated offsets (i.e., triple offsets) to an eight-ball type joint, according to another preferred embodiment of the invention;

DETAILED DESCRIPTION OF THE INVENTION

Figure 1A:
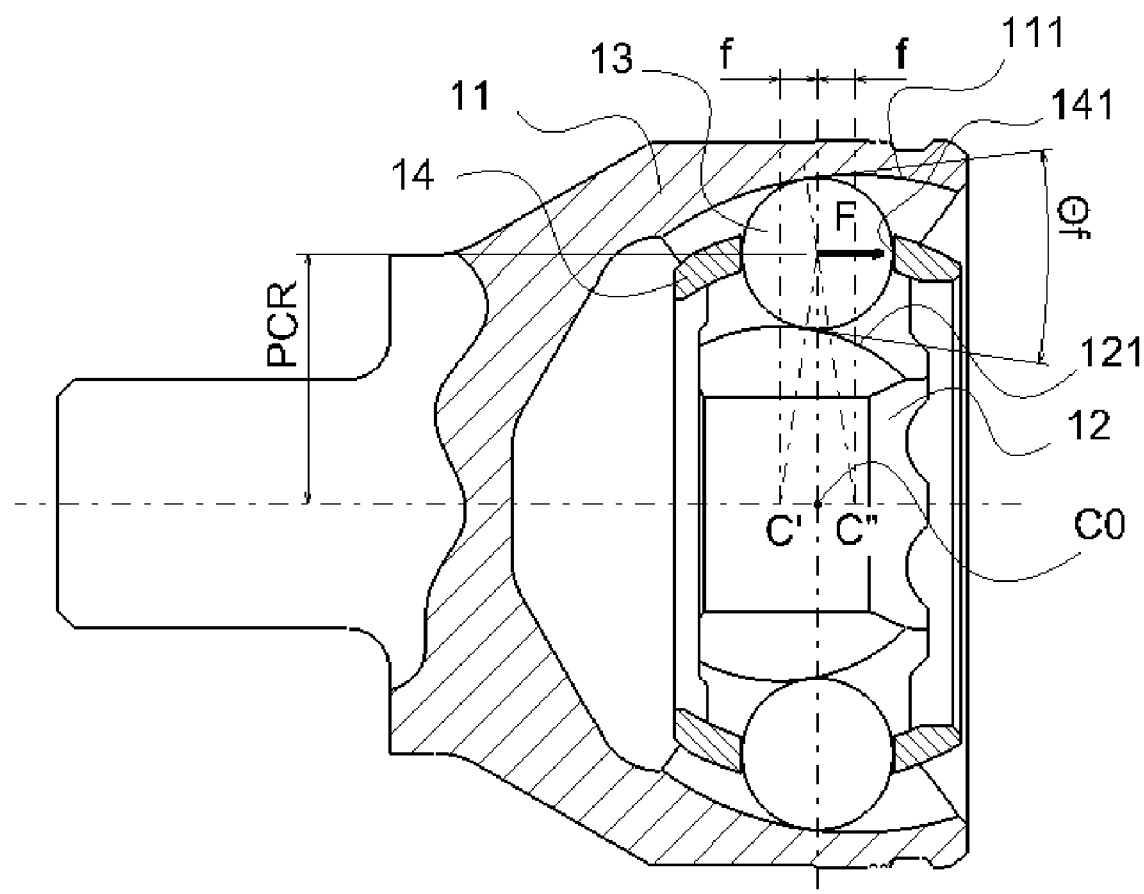
FIGS. 1(a) to 1(c) are cross-sectional views illustrating a conventional fixed type constant velocity joint known as the Rzeppa joint.
Figure 1B:
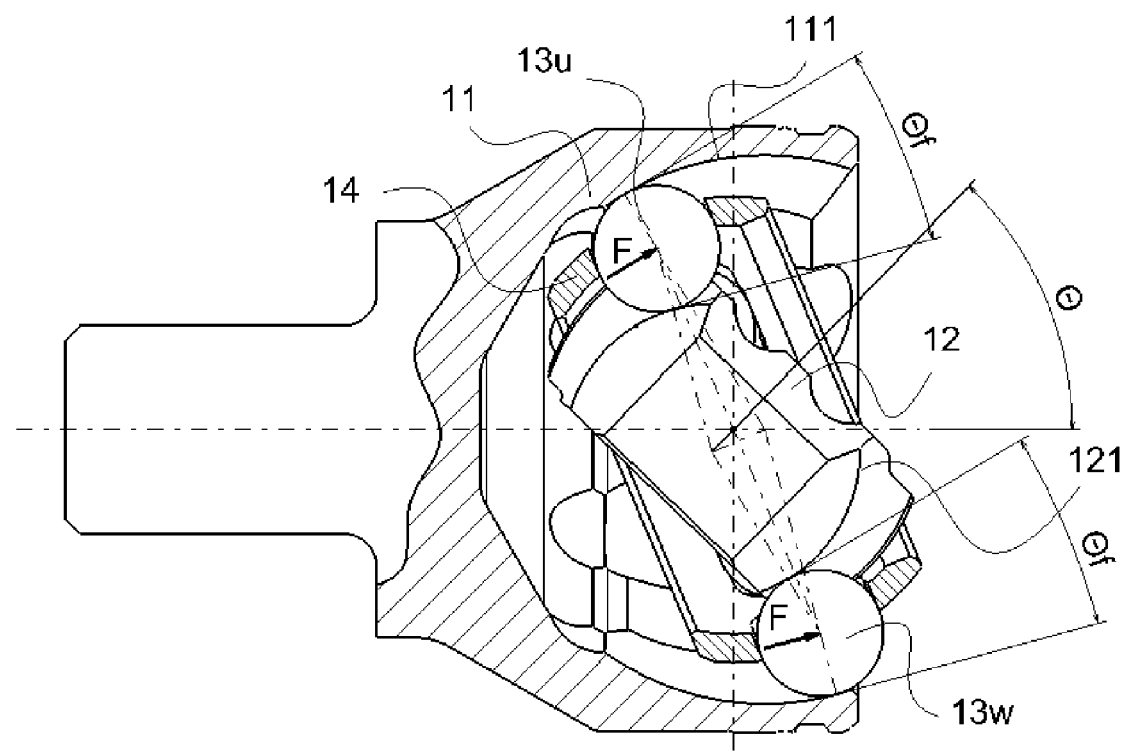
Figure 1C:
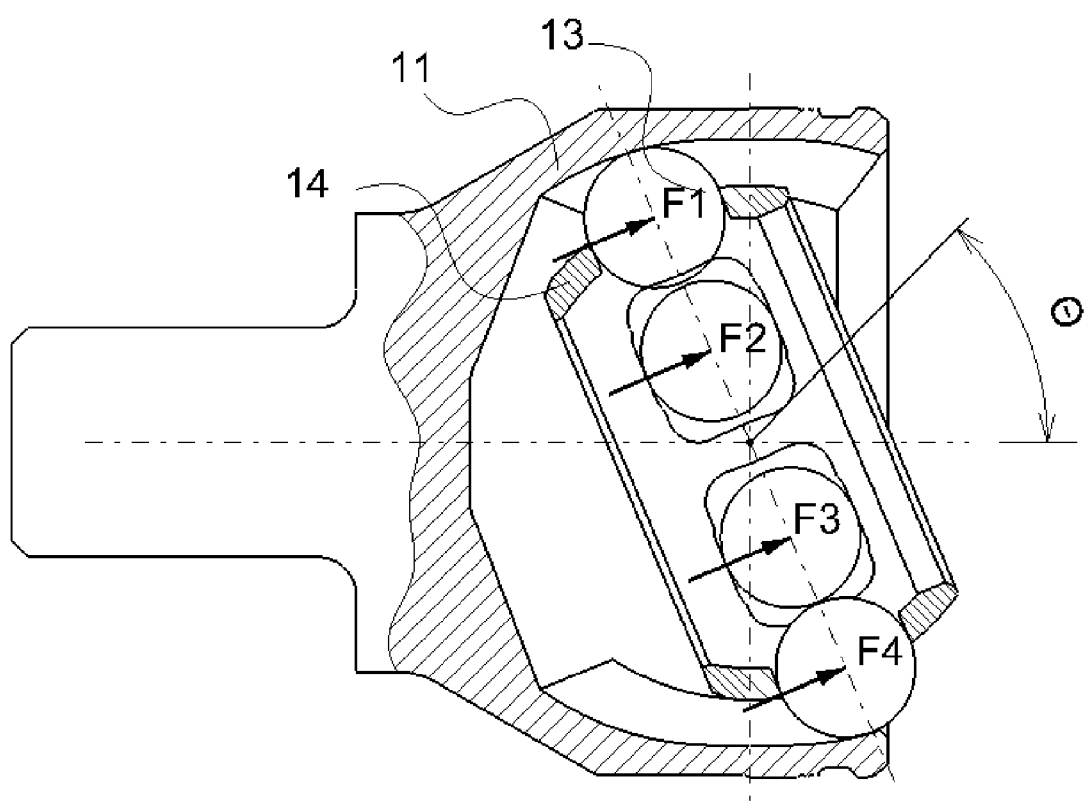
Figure 2:
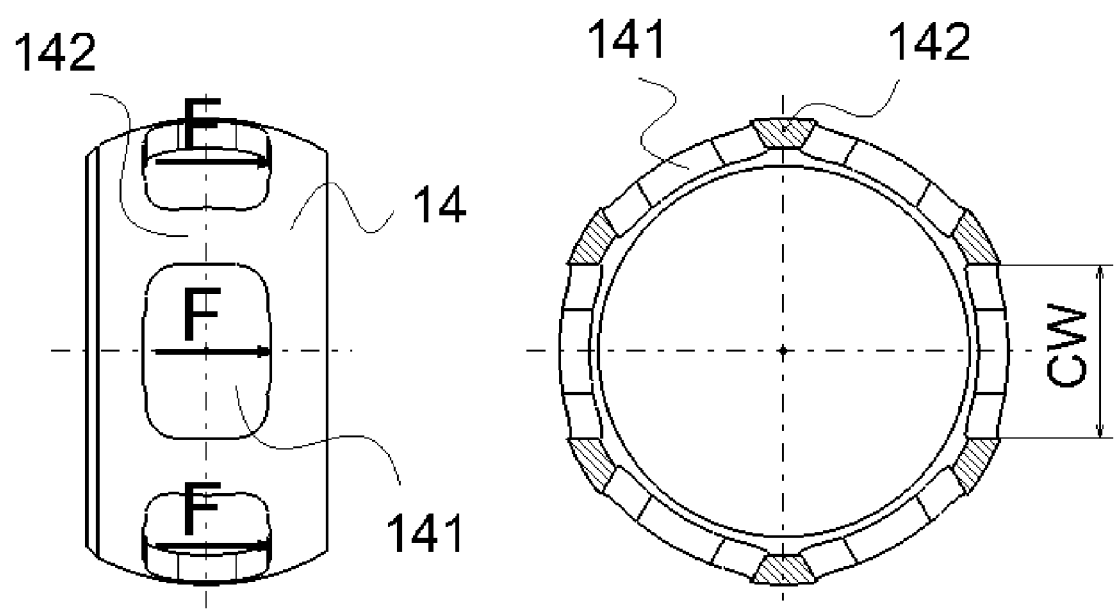
FIG. 2 illustrates a typical shape of a ball cage with six windows for retaining six balls therein.
Figure 3A:
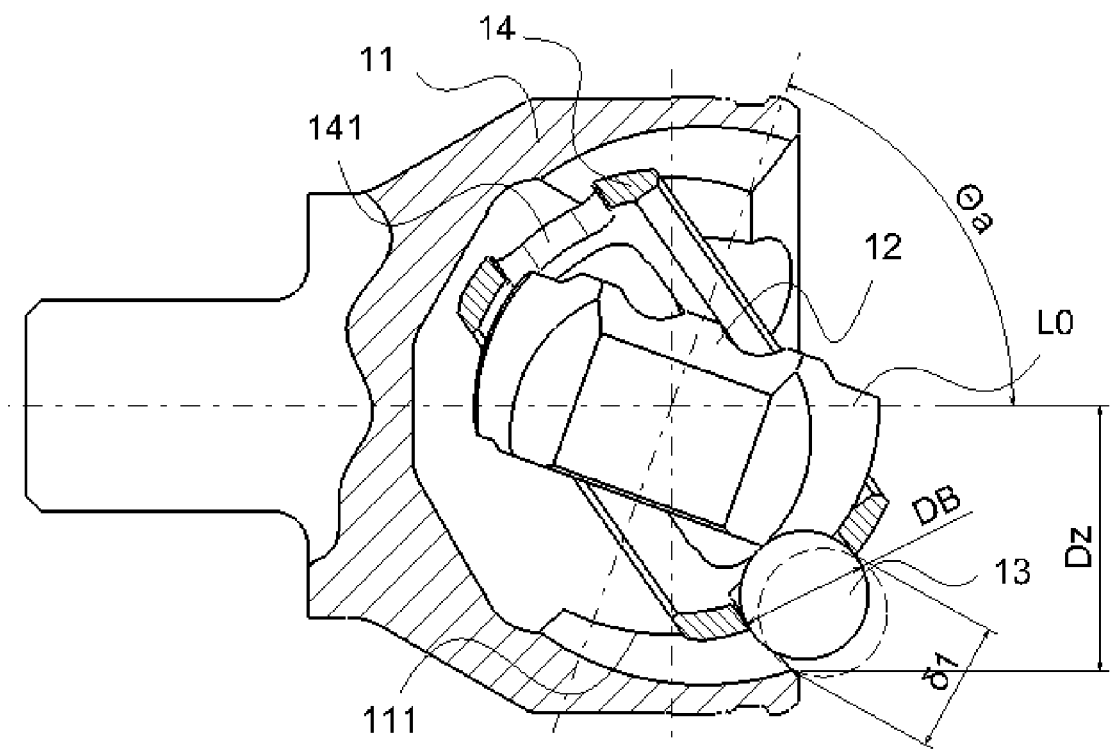
FIG. 3(a) is a cross-sectional view illustrating the state when the joint is articulated for assembling.
Figure 3B:
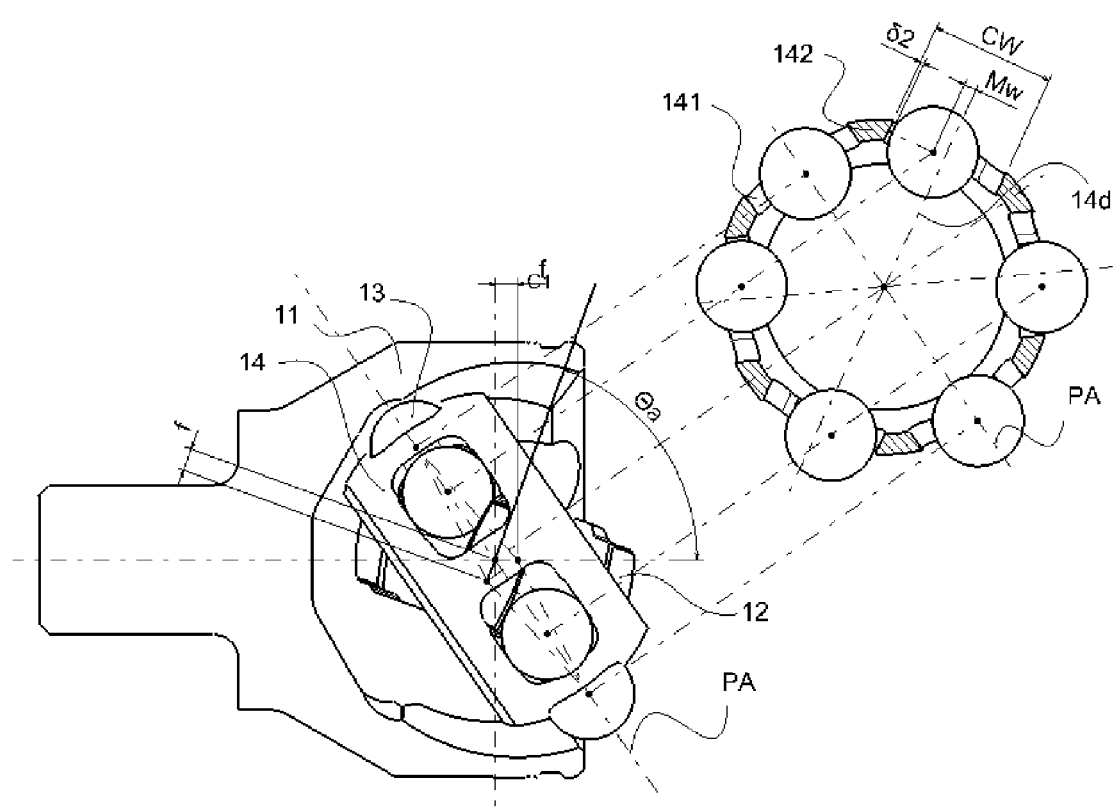
FIG. 3(b) are cross-sectional views illustrating movements of the balls in the cage of six ball type joint.

With reference to the accompanied drawings, the fixed type constant velocity joints of the present invention are described herein in further details in connection with several exemplary or preferred embodiments thereof by way of examples of the invention. However, the following descriptions of such embodiments are intended primarily for illustrating the principles and exemplary or presently preferred constructions of the fixed type constant velocity joints, and the present invention is not specifically limited to these exemplary or preferred embodiments as disclosed. Thus, one skilled in the art can appreciate or recognize that various modifications and substitutions can be made thereto without departing from the spirit and scope of the present invention.

In the following disclosure, the same or substantially similar parts or portions thereof are referred with the same reference numerals for simplicity purposes. With reference to FIGS. 4 to 7(c), preferable embodiments of the invention are described herein, in which the joint provides differentiated offsets (i.e., dual, triple, and multiple offsets) in the groove shapes to reduce the maximum ball movement in the cage.

Figure 4:
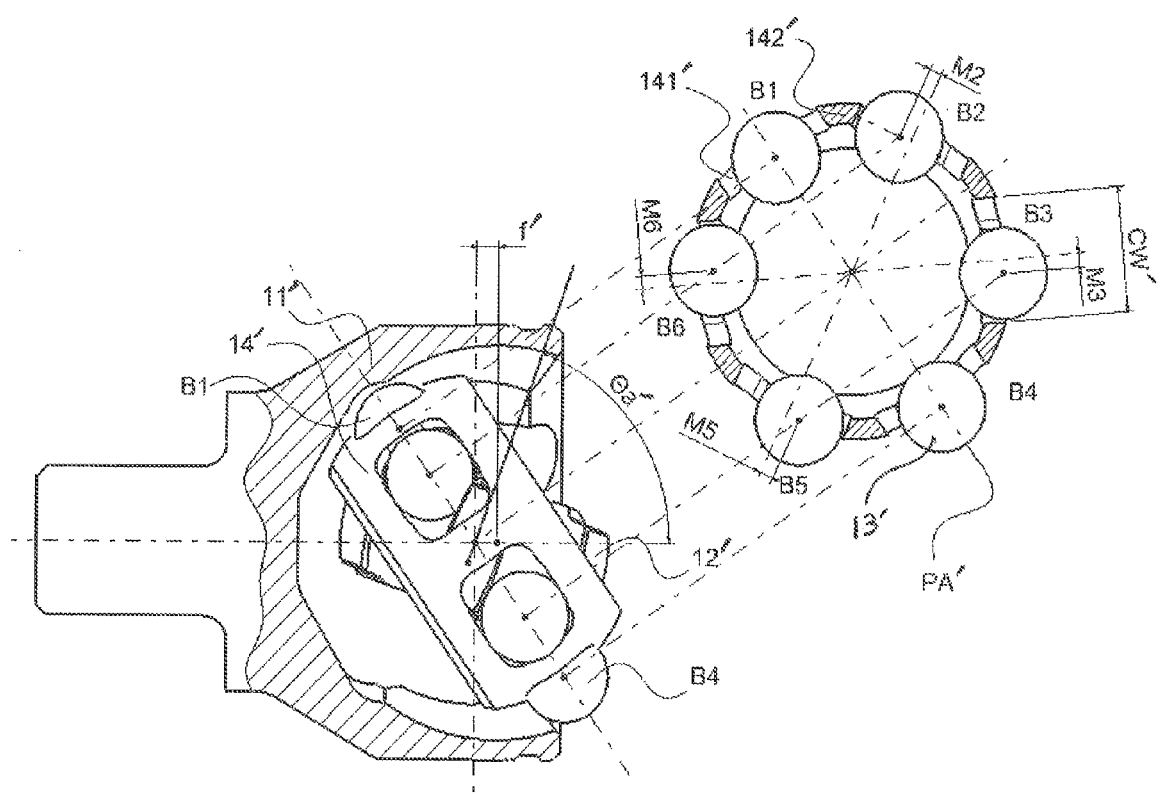
FIG. 4 is cross-sectional views illustrating the movements of each ball in a six-ball fixed constant velocity joint with the joint articulated at a minimum joint assembly angle.

FIG. 4 illustrates movements of the balls in a six ball type joint when the joint is articulated to the minimum joint assembly angle θa' for assembling, in which the ball position in the particular cage window CW' varies depending on the angular position of the balls relative to a neutral or reference axis PA'. In general, the minimum joint assembly θa' is designed to have a larger angle than the maximum operating angle θ' (which is the maximum articulation angle of the joint during operation). Therefore, the maximum ball movement in the cage window 141' occurs when the joint is at the minimum joint assembly angle θa' which is larger than the maximum operating angle θ'. Accordingly, as will be described below with further details, the present invention is concerned to reduce the maximum ball movement by effectively applying differentiated offsets to the track grooves according to the angular position of the particular tracks.

When the six-ball type joint is articulated to an angle, the two balls B1 and B4 located in the neutral or reference articulation plane PA' do not move, but four other balls B2, B3, B5, and B6 have movements in rotational or angular direction in the cage window CW'. The balls B2, B3, B5, and B6 have movements of M2, M3, M5, and M6, respectively, and M2 equals to M6, and M3 equals to M5. In the joint with six balls, M3 and M5 are slightly larger than M2 and M6. Therefore, the optimum width of cage window CW' for covering the maximum ball movement is to be determined by the distance M3 and M5. Here, it is particularly noted that this maximum ball movement (M3, M5) happens only during the assembling process with articulation angle θa', rather than under a normal operating condition with articulation angle θ'.

Thus, if the ball movement is reduced for the two balls B3 and B5 (or, alternatively, for four balls B2, B3, B5, and B6), the maximum ball movement can be reduced without any interference between the ball 13' and cage web 142' during the assembly process and in operation as well. In general, the ball movement is affected by the joint angle θ' and center offset f'. If the center offset f' is reduced, the ball movements can be reduced as well. However, if the center offset f' is reduced, it leads to limit the articulation angle of the joint. Thus, the present invention provides a differentiated offset configuration in the track grooves to reduce the maximum ball movement, by application of a larger offset to the grooves with the balls having a smaller movement (e.g., positions B1 and B4) and of a smaller offset to the grooves with the balls having a larger movement (e.g., positions B2, B3, B5 and B6). With the differentiated offset groove configuration, the grooves with smaller offsets take a role to reduce the maximum ball movement, and the grooves with larger offsets to maintain a smooth articulation with balls.

Figure 5A:
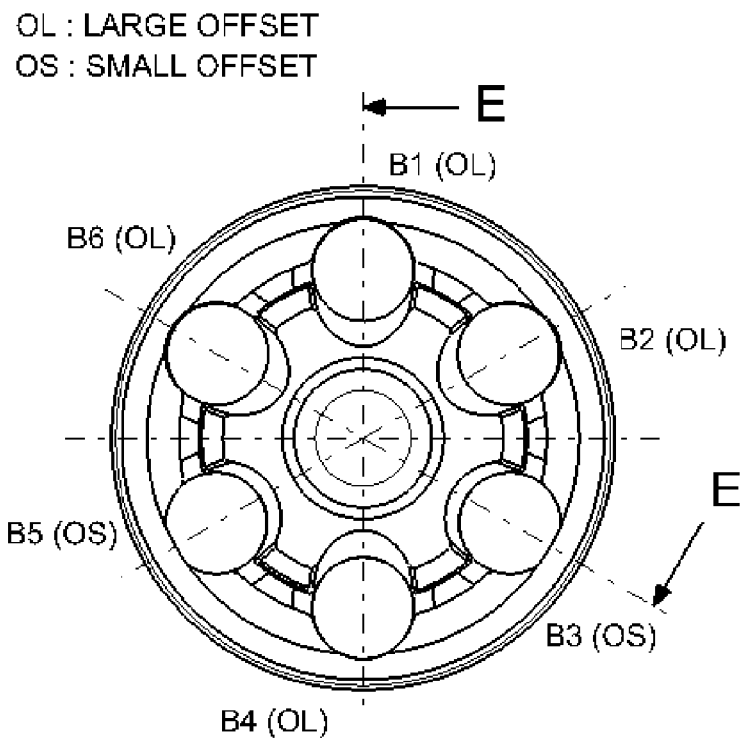
FIG. 5(a) is a right side view illustrating the application of differentiated offsets (i.e., dual offsets) to a six-ball type joint, according to one preferred embodiment of the invention.
Figure 5B:
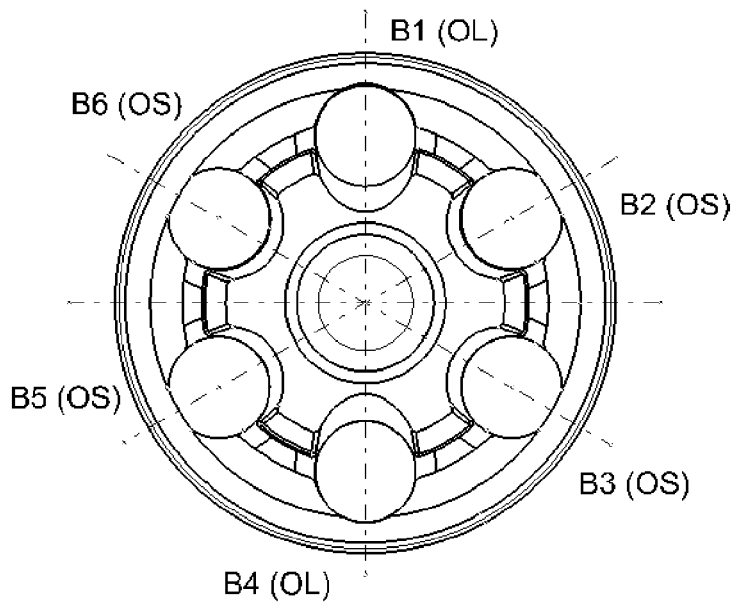
FIG. 5(b) is a right side view illustrating the application of differentiated offsets (i.e., dual offsets) to a six-ball type joint, according to another preferred embodiment of the invention.

FIG. 5(a) illustrates the application of the differentiated offset (i.e., dual offset) grooves to a six ball type joint, according to one preferable embodiment of the invention. FIG. 5(b) illustrates the application of the differentiated offset grooves to the six ball type joint, according to another preferable embodiment of the invention. In the six ball type joint, as the joint is articulated at the minimum joint assembly angle θa', the maximum ball movements occur at positions B3 and B5. The ball movements of B2 and B6 are slightly smaller than the ball movements of B3 and B5, and the ball movements of B1 and B4 does not occur since they are in neutral positions. Therefore, if the smaller offset grooves are applied for B3 and B5 and the larger offset grooves for B1, B2, B4 and B6 as shown in FIG. 5(a), or alternatively, if the smaller offset grooves are applied for B2, B3, B5 and B6 and the larger offset grooves for B1 and B4 as shown in FIG. 5(b), the maximum ball movement can be reduced, and the thickness of cage web 142' and its strength can effectively be increased.

Figure 5C:
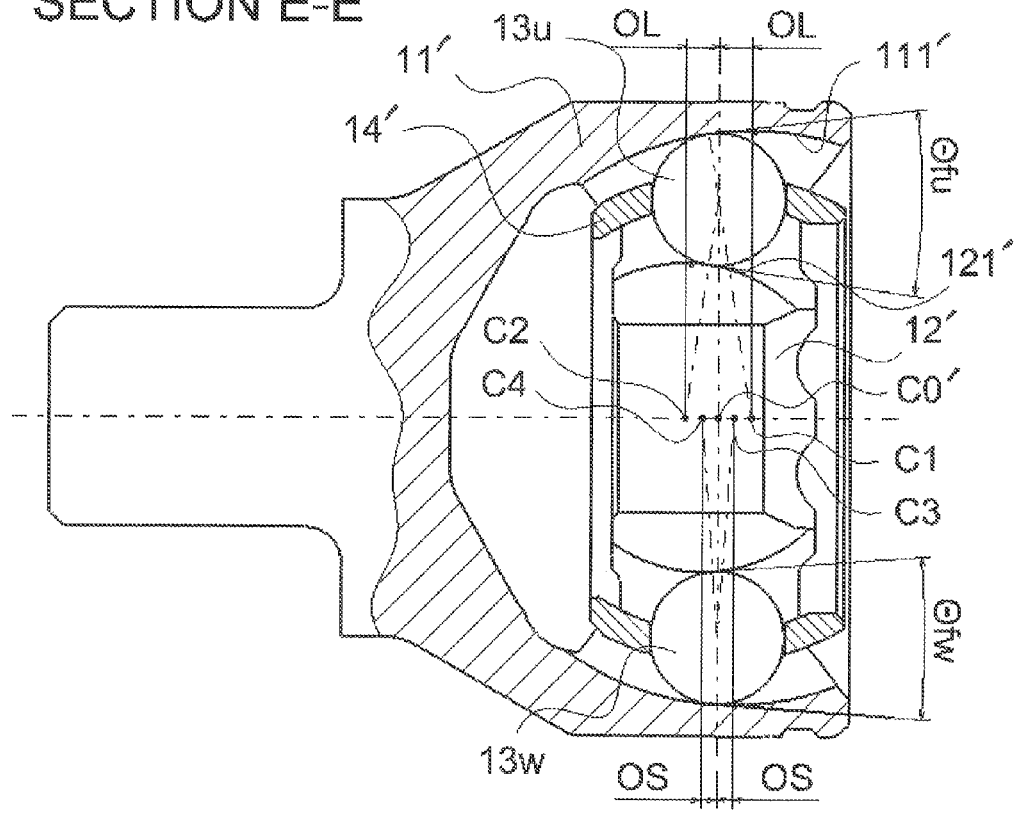
FIG. 5(c) is a cross-sectional view taken along line E-E in FIG. 5(a), illustrating the application of differentiated offsets (i.e., dual offsets) according to one preferred embodiment of the present invention.

FIG. 5(c) illustrates the groove configuration of the section E-E of FIG. 5(a), which comprises two different offsets, namely a larger offset OL and a smaller offset OS in their groove structures. In this figure, the upper groove represents the grooves which have a larger offset OL, and the lower groove represents the grooves which have a smaller offset OS.

With reference to FIG. 5(c), the structure and track groove configuration of the invention is described with further details. The fixed type joint has an outer race 11' having a spherical inner space formed with a plurality of (e.g., six in this embodiment) outer ball grooves 111', and an inner race 12' with a plurality of (e.g., six) corresponding upper ball grooves 121'. A plurality of (e.g., six) torque transmitting balls 13' (with only ball 13u at B1 position and lower ball 13w at B3 position shown) are received and guided in a respective track defined by a outer ball groove 111' and its corresponding inner (or upper) ball groove 121', and a cage 14' which has a plurality of (e.g., six) cage windows 141' to hold the balls 13' in a same plane. In the drawing, unexplained reference θfu refers to the funnel angle on the ball 13u at B1 position, and reference θfw refers to the funnel angle on the ball 13w at B3 position.

In all tracks, the groove configuration includes common features in that the ball guide grooves 111' and 121' of the outer and inner races 11' and 12' each have a curved contact surface curved with a radius, as is similar to the conventional Rzeppa joint as described above in connection with FIG. 1(a).

However, in the tracks located at B1, B2, B4 and B6 (i.e., tracks with smaller ball movements), the outer and inner guide grooves 111' and 121' have its centers at C1 and C2, respectively, and they are offset with respective to the spherical joint center C0 of the outer and inner races 11' and 12' by a distance OL in opposite directions. In the tracks located at B3 and B5 (i.e., tracks with larger ball movements), the outer and inner guide grooves 111' and 121' have its centers at C3 and C4, respectively, and they are offset with respective to the spherical joint center C0 of the outer and inner races 11' and 12' by a distance OS (which is smaller than OL) in opposite directions. In this manner, by applying smaller offsets to the track grooves with larger ball movements and larger offsets to the track grooves with smaller ball movements, the present embodiment of the invention provides differentiated offsets (namely, dual offsets) depending on the angular position of the particular tracks. As a consequence, the maximum movements of the balls in the cage can be reduced, and the thickness of cage web 142' can be enlarged as compared to the conventional joints such as the Rzeppa joint and other kinds of non-differentiated offset joints.

With the differentiated offsets as described above, the joint of the present invention can effectively provide a constant velocity characteristic and accommodate a smooth movement of balls 13' when the outer and inner joints are articulated with respect to each other.

Figure 5D:
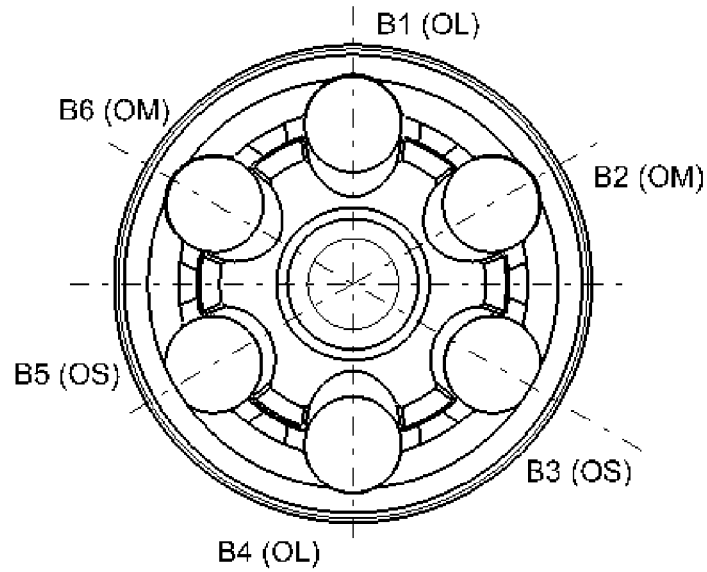
FIG. 5(d) is a right side view illustrating the application of differentiated offsets (i.e., triple or multiple offsets) to a six-ball type joint, according to another preferred embodiment of the invention.

FIG. 5(d) illustrates the application of the differentiated offset (i.e., triple offsets) grooves to a six ball type joint, according to another preferable embodiment of the invention. In this alternative embodiment of six ball type joint, three different offsets are applied to more effectively control and optimize the thickness of cage web 142', by applying the smallest offset grooves (OS) to B3 and B5 where the maximum ball movements occur, the medium or middle amount offset grooves (OM) to B2 and B6 where the medium ball movements occur, and the largest offset grooves (OL) to B1 and B4 where the minimum ball movements occur. In this manner, the respective thickness of cage web 142' between the balls can be further optimized, thereby, increasing the average or mean thickness of the cage web 142' as compared to the previous embodiments of FIGS. 5(a) and 5(b) which apply dual offsets as described above.

Figure 5E:
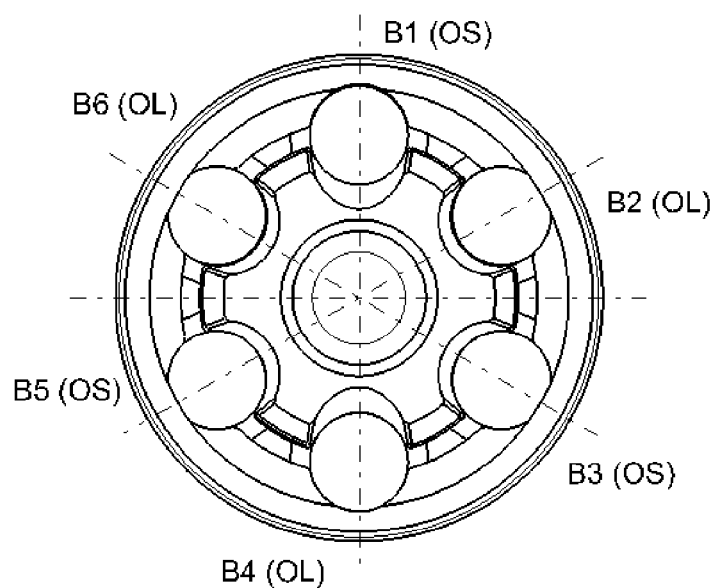
FIG. 5(e) is a right side view illustrating the application of differentiated offsets (i.e., dual offsets) to a six-ball type joint, according to another preferred embodiment of the invention.

FIG. 5(e) illustrates another alternative embodiment of six ball type joint of the invention, in which differentiated offsets (i.e., dual offsets) are applied to grooves of the six ball type joint in a different manner. In this embodiment, larger offsets (OL) are applied to B2 and B6 and B4 where the medium and minimum ball movements occur, and smaller offsets (OS) are applied to B3 and B5 (where the maximum ball movements occur) and B1 as well (although it has the minimum ball movement). In this embodiment, the respective thickness of cage web 142' between the balls is not well optimized as compared to the previous embodiments of FIGS. 5(*a*), 5(*b*), and 5(*d*). However, by applying the differentiated offsets, this embodiment can increase the mean thickness of the cage web 142' when compared to the Rzeppa joint and other kinds of non-differentiated offset joints. Moreover, by having a larger offset and a smaller offset arranged alternately one after another, the groove shape of the joint can be manufactured more easily and efficiently as compared to the previous embodiments of FIGS. 5(*a*), 5(*b*), and 5(*d*) with irregular groove combinations.

Figure 6A:
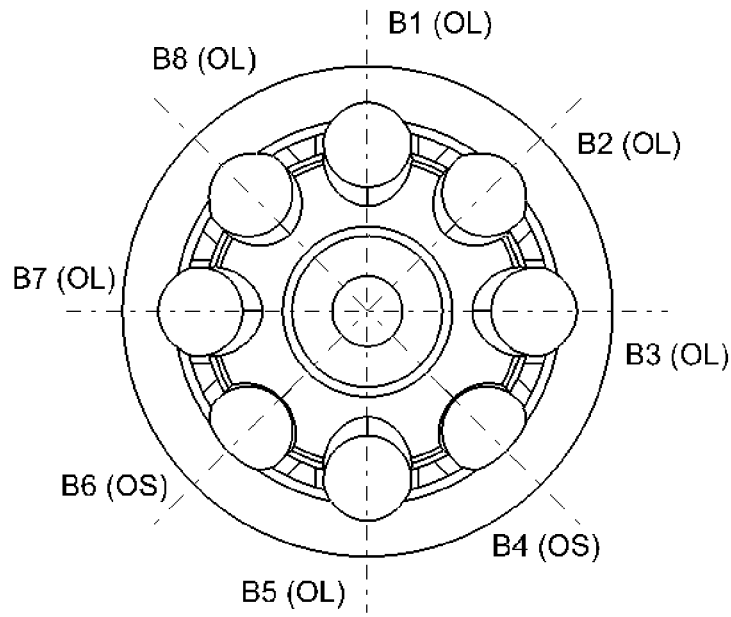
FIG. 6(a) is a right side view illustrating the application of differentiated offsets (i.e., dual offsets) to an eight-ball type joint, according to one preferred embodiment of the invention.
Figure 6B:
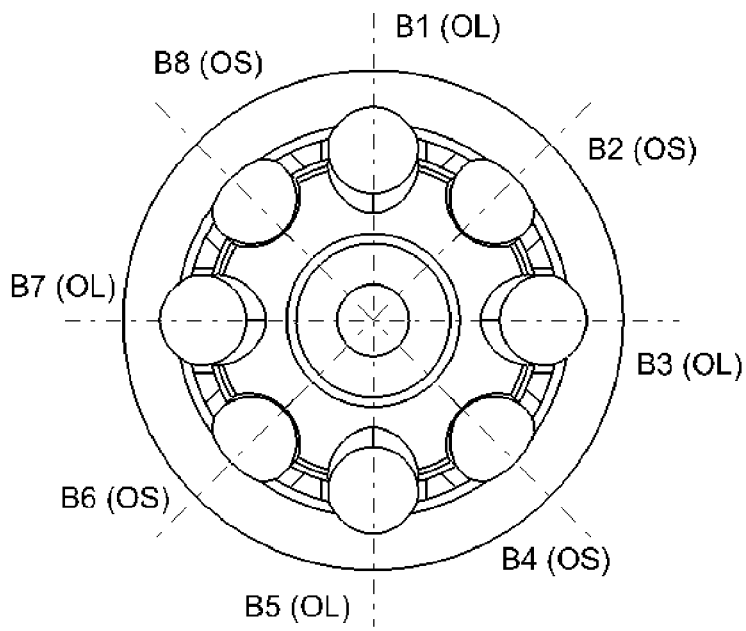
FIG. 6(b) is a right side view illustrating the application of differentiated offsets (i.e., dual offsets) to an eight-ball type joint, according to another preferred embodiment of the invention.

FIGS. 6(*a*) and 6(*b*) illustrate two examples for applying the differentiated (e.g., dual) offset groove configurations to an eight ball type joint. In the eight ball type joint, as the joint is articulated at the minimum joint assembly angle θa', the maximum ball movements occur at B4 and B6. The ball movements of B2 and B8 are slightly smaller than the ball movements of B4 and B6, and the ball movements of B1, B3, B5 and B7 do not occur. Therefore, if the smaller offset grooves are applied to B4 and B6 and the larger offset grooves to B1, B2, B3, B5, B7 and B8 as shown in FIG. 6(*a*), or alternatively, if the smaller offset grooves are applied to B2, B4, B6 and B8 and the larger offset grooves to B1, B3, B5 and B7 as shown in FIG. 6(*b*), the maximum ball movement can be reduced, and the thickness of cage web 142' and its strength can effectively be increased.

FIG. 6(*c*) illustrates the application of the differentiated offset (i.e., triple offsets) grooves to an eight ball type joint, according to another preferable embodiment of the invention. In this alternative embodiment, three different offsets are applied to the eight ball type joint in order to more effectively control and optimize the thickness of cage web 142', by applying the smallest offset grooves (OS) to B4 and B6 where the maximum ball movements occur, the medium offset grooves (OM) to B2 and B8 where the medium ball movements occur, and the largest offset grooves (OL) to B1, B3, B5 and B7 where the minimum ball movements occur. In this manner, the respective thickness of cage web 142' between the balls can be further optimized, thereby, increasing the mean thickness of the cage web 142' as compared to the previous embodiments of FIGS. 6(*a*) and 6(*b*) which apply dual offsets as described above.

Figure 7A:
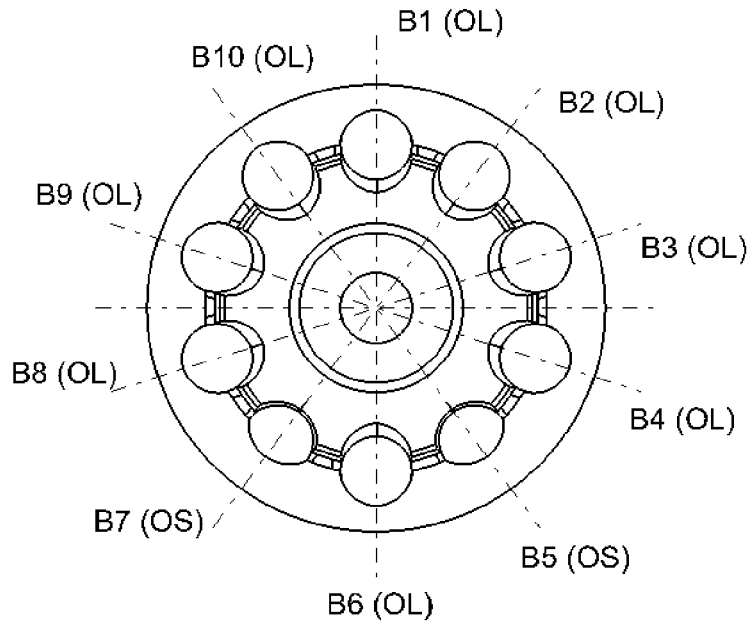
FIG. 7(a) is a right side view illustrating the application of differentiated offsets (i.e., dual offsets) to a ten-ball type joint, according to one preferred embodiment of the invention.
Figure 7B:
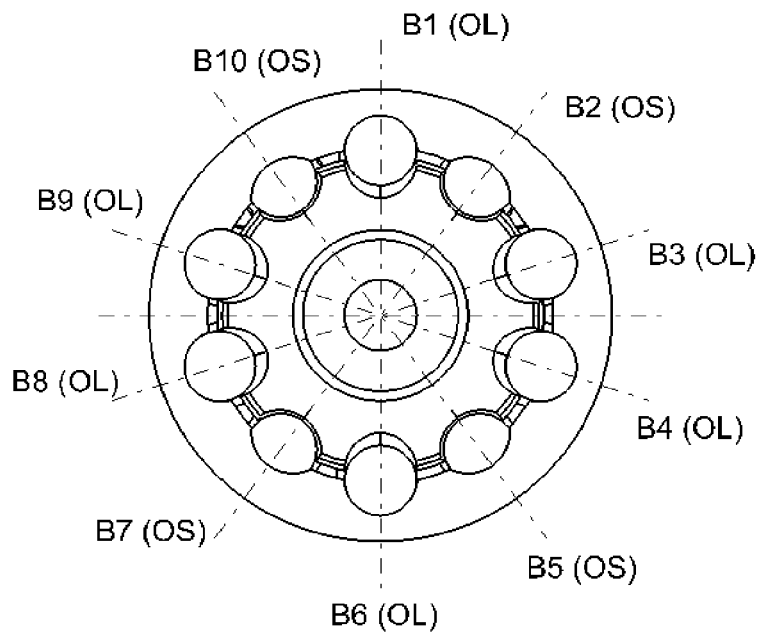
FIG. 7(b) is a right side view illustrating the application of differentiated offsets (i.e., dual offsets) to a ten-ball type joint, according to another preferred embodiment of the invention.
Figure 7C:
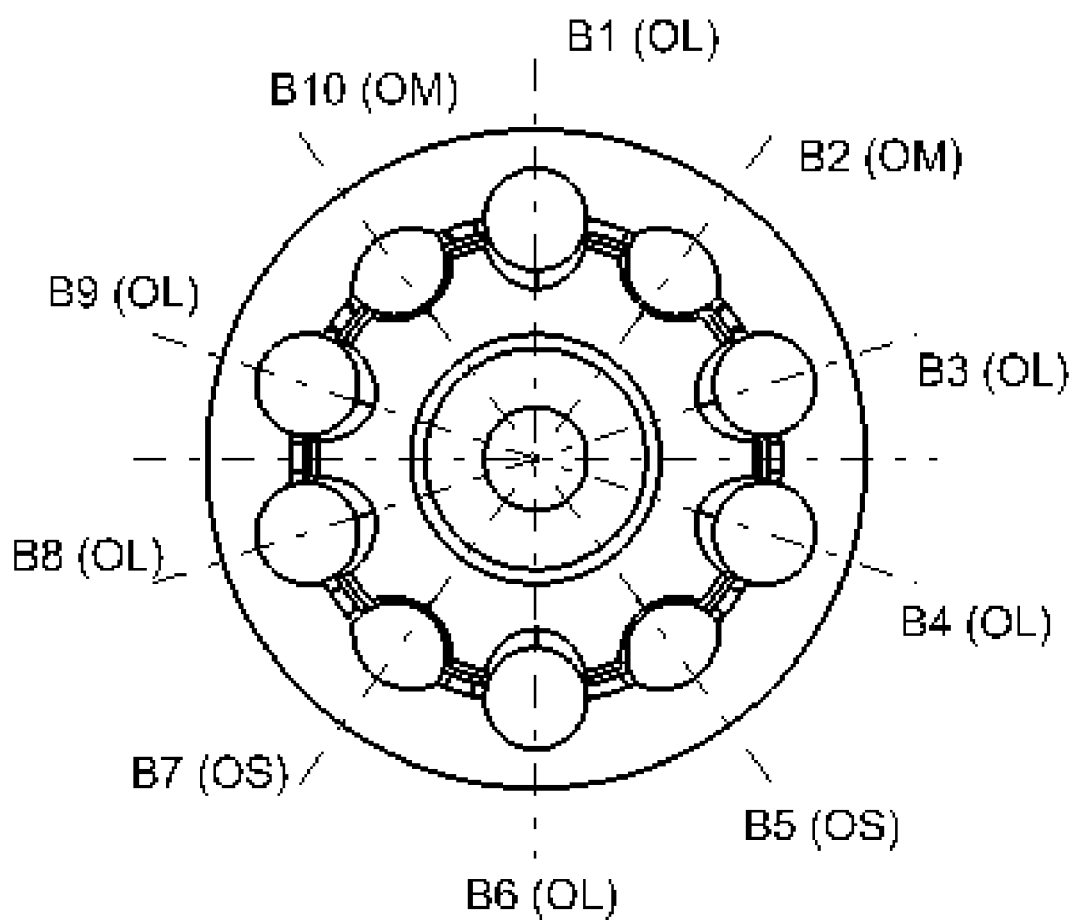
FIG. 7(c) is a right side view illustrating the application of differentiated offsets (i.e., triple offsets) to a ten-ball type joint, according to another preferred embodiment of the invention.

FIGS. 7(*a*) and 7(*b*) illustrate another two examples for applying dual or differentiated offset groove configurations to a ten ball type joint. In the ten ball type joint, as the joint is articulated at the minimum joint assembly angle θa', the maximum ball movements occur at B5 and B7. The ball movements of B2 and B10 are slightly smaller than the ball movements of B5 and B7, and the ball movements of B3, B4, B8 and B9 are very small compared to the ball movements of B5 and B7, and the ball movements of B1 and B6 does not occur. Therefore, if the smaller offset grooves are applied to B5 and B7 and the larger offset grooves to B1, B2, B3, B4, B6, B8, B9 and B10 as shown in FIG. 7(*a*), or alternatively, if the smaller offset grooves are applied to B2, B5, B7 and B10 and the larger offset grooves to B1, B3, B4, B6, B8 and B9 as shown in FIG. 7(*b*), the maximum ball movement can be reduced, and the thickness of cage web 142' and its strength can effectively be increased.

FIG. 7(*c*) illustrates the application of the differentiated offset (i.e., triple offsets) grooves to a ten ball type joint, according to another preferable embodiment of the invention. In this alternative embodiment, three different offsets are applied to the ten ball type joint in order to more effectively control and optimize the thickness of cage web 142', by applying the smallest offset grooves (OS) to B5 and B7 where the maximum ball movements occur, the medium offset grooves (OM) to B2 and B10 where the medium ball movements occur, and the largest offset grooves (OL) to B1, B3, B4, B6, B8 and B9 where the minimum or less ball movements occur. In this manner, the respective thickness of cage web 142' between the balls can be further optimized, thereby, increasing the mean thickness of the cage web 142' as compared to the previous embodiments of FIGS. 7(*a*) and 7(*b*) which apply dual offsets as described above.

The present invention is described above in association with several embodiments of the joint comprising six balls, eight balls, and ten balls therein. However, the present invention is not intended to limit thereto, but can be applied to the fixed type joint with more than ten balls in the same or similar manner as described above, namely, by applying dual, triple, and/or multiple offsets, or any possible combination of differentiated offsets to the ball grooves of the joint, with smaller offsets applied generally to the grooves having relatively large ball movements and larger offsets applied generally to the grooves having relatively small ball movements in the particular joints of concern.

As described above, by utilizing the inventive differentiated (dual or multiple) offset configurations to the track grooves of the joint, the present invention can provide a reliable and effective construction to the fixed type joint without compromising the strength and durability. Moreover, utilizing the effective and optimized configurations in the groove design, the present invention is also effectively applicable to the fixed type joint with higher balls, namely, from six balls to ten balls or more.

As described above, the constant velocity joint of the present invention is described mainly in connection with several exemplary embodiments thereof. The above disclosed embodiments of the invention are representatives of a presently preferred form of the invention, but are intended to be illustrative rather than definitive thereof. Accordingly, those skilled in the art will appreciate or recognize that various modifications and substitutions can be made thereto without departing from the spirit and scope of the present invention as set forth in the appended claims.

What is claimed is:

1. A fixed type constant velocity joint comprising:
an outer race having an inner spherical surface, and a plurality of guide grooves formed in an axial direction in the inner spherical surface of the outer race, each guide groove having a circular shape in a longitudinal cross section thereof;
an inner race having an outer spherical surface, and a plurality of guide grooves formed in an axial direction in the outer spherical surface of the inner race, each guide groove having a circular shape in a longitudinal cross section thereof, said guide grooves of the outer race and said guide grooves of the inner race together forming a plurality of ball guide tracks arranged around the circumference of the joint;
a plurality of balls disposed in the ball guide tracks; and
a cage installed between the inner spherical surface of the outer race and the outer spherical surface of the inner race, said cage having a plurality of windows for retaining the balls therein;
wherein the ball guide tracks include different groove configurations having multiple or differentiated center offsets with smaller offsets applied to the tracks having relatively large ball movements and larger offsets applied to the tracks having relatively small ball movements as the joint is articulated for assembling.

2. The constant velocity joint of claim 1, wherein the joint contains six balls, and smaller offsets are applied to two tracks located at 120 degree and 240 degree, when an angular position of the ball closest to the outer race bottom is defined to be at 0 degree as the joint is articulated for assembling, and the remaining four tracks located at positions other than identified above in this claim have larger offsets.

3. The constant velocity joint of claim 1, wherein the joint contains six balls, and smaller offsets are applied to four tracks located at 60 degree, 120 degree, 240 degree, and 300 degree, when an angular position of the ball closest to the outer race bottom is defined to be at 0 degree as the joint is articulated for assembling, and the remaining two tracks located at positions other than identified above in this claim have larger offsets.

4. The constant velocity joint of claim 1, wherein the joint contains six balls, and smaller offsets are applied to two tracks located at 120 degree and 240 degree, and medium offsets are applied to two tracks located at 60 degree and 300 degree, when an angular position of the ball closest to the outer race bottom is defined to be at 0 degree as the joint is articulated for assembling, and the remaining two tracks located at positions other than identified above in this claim have larger offsets.

5. The constant velocity joint of claim 1, wherein the joint contains eight balls, and smaller offsets are applied to two tracks located at 135 degree and 225 degree, when an angular position of the ball closest to the outer race bottom is defined to be at 0 degree as the joint is articulated for assembling, and the remaining six tracks located at positions other than identified above in this claim have larger offsets.

6. The constant velocity joint of claim 1, wherein the joint contains eight balls, and smaller offsets are applied to four tracks located at 45 degree, 135 degree, 225 degree, 315 degree, when an angular position of the ball closest to the outer race bottom is defined to be at 0 degree as the joint is articulated for assembling, and the remaining four tracks located at positions other than identified above in this claim have larger offsets.

7. The constant velocity joint of claim 1, wherein the joint contains eight balls, and smaller offsets are applied to two tracks located at 135 degree and 225 degree, and medium offsets are applied to two tracks located at 45 degree and 315 degree, when an angular position of the ball closest to the outer race bottom is defined to be at 0 degree as the joint is articulated for assembling, and the remaining four tracks located at positions other than identified above in this claim have larger offsets.

8. The constant velocity joint of claim 1, wherein the joint contains ten balls, and smaller offsets are applied to two tracks located at 144 degree and 216 degree, when an angular position of the ball closest to the outer race bottom is defined to be at 0 degree as the joint is articulated for assembling, and the remaining eight tracks located at positions other than identified above in this claim have larger offsets.

9. The constant velocity joint of claim 1, wherein the joint contains ten balls, and smaller offsets are applied to four tracks located at 36 degree, 144 degree, 216 degree, 324 degree, when an angular position of the ball closest to the outer race bottom is defined to be at 0 degree as the joint is articulated for assembling, and the remaining six tracks located at positions other than identified above in this claim have larger offsets.

10. The constant velocity joint of claim 1, wherein the joint contains ten balls, and smaller offsets are applied to two tracks located at 144 degree and 216 degree, and medium offsets are applied to two tracks located at 36 degree and 324 degree, when an angular position of the ball closest to the outer race bottom is defined to be at 0 degree as the joint is articulated for assembling, and the remaining six tracks located at positions other than identified above in this claim have larger offsets.

11. The constant velocity joint of claim 1, wherein the joint contains more than ten balls.

12. A fixed type constant velocity joint comprising:
an outer race having an inner spherical surface, and a plurality of guide grooves formed in an axial direction in the inner spherical surface of the outer race;
an inner race having an outer spherical surface, and a plurality of guide grooves formed in an axial direction in the outer spherical surface of the inner race, said guide grooves of the outer race and said guide grooves of the inner race together forming a plurality of ball guide tracks arranged around the circumference of the joint;
a plurality of balls disposed in the ball guide tracks; and
a cage installed between the inner spherical surface of the outer race and the outer spherical surface of the inner race, said cage having a plurality of windows for retaining the balls therein;
wherein the ball guide tracks have different groove configurations, including first tracks with a first groove configuration and second tracks with a second groove configuration;
wherein the groove configuration of the first tracks is characterized in that: each of the guide grooves of the outer race is shaped to have a longitudinal cross section which contains a first circular shape with a center, and each of the guide grooves of the inner race is shaped to have a longitudinal cross section which contains a second circular shape with a center, the center of the first circular shape and the center of the second circular shape are located in opposite sides respectively displaced by a first offset distance from a joint center line of the joint;
wherein the groove configuration of the second tracks is characterized in that: each of the guide grooves of the outer race is shaped to have a longitudinal cross section which contains a first circular shape with a center, and each of the guide grooves of the inner race is shaped to have a longitudinal cross section which contains a second circular shape with a center, the center of the first circular shape and the center of the second circular shape are located in opposite sides respectively displaced by a second offset distance from a joint center line of the joint, the second offset distance smaller than the first offset distance of the first tracks;
wherein the first tracks with larger offset distance are located at the tracks having relatively small ball movements as the joint is articulated for assembling, and the second tracks with smaller offset distance are located at tracks having relatively large ball movements as the joint is articulated for assembling.

13. The constant velocity joint of claim 12, wherein the joint contains six balls, and the second tracks with smaller offset distance are applied to either two tracks located at 120 degree and 240 degree or four tracks located at 60 degree, 120 degree, 240 degree, 300 degree, respectively, when an angular position of the ball closest to the outer race bottom is defined to be at 0 degree as the joint is articulated for assembling, and the first tracks with larger offset distance are applied to the remaining tracks located at positions other than identified above in this claim.

14. The constant velocity joint of claim 12, wherein the ball guide tracks further include third tracks with a third groove configuration; and the groove configuration of the third tracks is characterized in that: each of the guide grooves of the outer race is shaped to have a longitudinal cross section which contains a first circular shape with a center, and each of the guide grooves of the inner race is shaped to have a longitudinal cross section which contains a second circular shape with a center, the center of the first circular shape and the center of the second circular shape are located in opposite sides respectively displaced by a third offset distance from a joint center line of the joint, the third offset distance having a size between the first offset distance of the first tracks and the second offset distance of the second tracks, and wherein the joint contains six balls, and the second tracks with smaller offset distance are applied to two tracks located at 120 degree and 240 degree, and the third tracks with medium offset distance are applied to two tracks located at 60 degree and 300 degree, when an angular position of the ball closest to the outer race bottom is defined to be at 0 degree as the joint is articulated for assembling, and the first tracks with larger offset distance are applied to the remaining tracks located at positions other than identified above in this claim.

15. The constant velocity joint of claim 12, wherein the joint contains eight balls, and the second tracks with smaller offset distance are applied to either two tracks located at 135 degree and 225 degree or four tracks located at 45 degree, 135 degree, 225 degree, 315 degree, respectively, when an angular position of the ball closest to the outer race bottom is defined to be at 0 degree as the joint is articulated for assembling, and the first tracks with larger offset distance are applied to the remaining tracks located at positions other than identified above in this claim.

16. The constant velocity joint of claim 12, wherein the ball guide tracks further include third tracks with a third groove configuration; and the groove configuration of the third tracks is characterized in that: each of the guide grooves of the outer race is shaped to have a longitudinal cross section which contains a first circular shape with a center, and each of the guide grooves of the inner race is shaped to have a longitudinal cross section which contains a second circular shape with a center, the center of the first circular shape and the center of the second circular shape are located in opposite sides respectively displaced by a third offset distance from a joint center line of the joint, the third offset distance having a size between the first offset distance of the first tracks and the second offset distance of the second tracks, and wherein the joint contains eight balls, and the second tracks with smaller offset distance are applied to two tracks located at 135 degree and 225 degree, and the third tracks with medium offset distance are applied to two tracks located at 45 degree and 315 degree, when an angular position of the ball closest to the outer race bottom is defined to be at 0 degree as the joint is articulated for assembling, and the first tracks with larger offset distance are applied to the remaining tracks located at positions other than identified above in this claim.

17. The constant velocity joint of claim 12, wherein the joint contains ten balls, and the second tracks with smaller offset distance are applied at either two tracks located at 144 degree and 216 degree or four tracks located at 36 degree, 144 degree, 216 degree, 324 degree, respectively, when an angular position of the ball closest to the outer race bottom is defined to be at 0 degree as the joint is articulated for assembling, and the first tracks with larger offset distance are applied to the remaining tracks located at positions other than identified above in this claim.

18. The constant velocity joint of claim 12, wherein the ball guide tracks further include third tracks with a third groove configuration; and the groove configuration of the third tracks is characterized in that: each of the guide grooves of the outer race is shaped to have a longitudinal cross section which contains a first circular shape with a center, and each of the guide grooves of the inner race is shaped to have a longitudinal cross section which contains a second circular shape with a center, the center of the first circular shape and the center of the second circular shape are located in opposite sides respectively displaced by a third offset distance from a joint center line of the joint, the third offset distance having a size between the first offset distance of the first tracks and the second offset distance of the second tracks, and wherein the joint contains ten balls, and the second tracks with smaller offset distance are applied to two tracks located at 144 degree and 216 degree, and the third tracks with medium offset distance are applied to two tracks located at 36 degree and 324 degree, when an angular position of the ball closest to the outer race bottom is defined to be at 0 degree as the joint is articulated for assembling, and the first tracks with larger offset distance are applied to the remaining tracks located at positions other than identified above in this claim.

19. The constant velocity joint of claim 12, wherein the joint contains more than ten balls.

* * * * *